United States Patent

Skarpil et al.

(10) Patent No.: US 6,636,034 B2
(45) Date of Patent: Oct. 21, 2003

(54) MAGNETIC FIELD SENSOR, AND A METHOD FOR PRODUCING SUCH A SENSOR

(75) Inventors: Harry Skarpil, Schwalbach (DE); Dirk Peter Sopp, Bornich (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/155,872

(22) Filed: May 24, 2002

(65) Prior Publication Data

US 2003/0011365 A1 Jan. 16, 2003

(30) Foreign Application Priority Data

Jun. 19, 2001 (DE) .......... 101 29 222

(51) Int. Cl.⁷ .......... G01P 3/48
(52) U.S. Cl. .......... 324/173; 324/207.2
(58) Field of Search .......... 324/261, 252, 324/235, 207.13, 207.15, 207.25, 207.2, 174, 173, 207.17, 251; 174/52.2, 52.1; 29/595

(56) References Cited

U.S. PATENT DOCUMENTS 4,847,557 A * 7/1989 Saito et al. .......... 324/207.13
5,093,617 A * 3/1992 Murata .......... 324/251
5,196,794 A * 3/1993 Murata .......... 324/251

FOREIGN PATENT DOCUMENTS

| DE | 2328370 | 12/1974 |
|----|---------|---------|
| DE | 3902218 | 8/1990 |
| DE | 69411454 | 11/1994 |
| DE | 19504820 | 7/1996 |
| DE | 3706168 | 9/1998 |
| EP | 0187902 | 10/1988 |
| EP | 0546355 | 6/1993 |
| WO | 0163211 | 8/2001 |

* cited by examiner

Primary Examiner—N. Le
Assistant Examiner—Subhash Zaveri
(74) Attorney, Agent, or Firm—Martin A. Farber

(57) ABSTRACT

A magnetic field sensor has a carrier element (1) made from metal, on which a holder (2) with a sensor element (3) is fixed in a set position. For this, the holder (2) engages with holding tongues (9, 10), having barbs (11), in recesses (12, 13) in the holder (2). An interspace (15), filled up by an extrusion coating (16), which also surrounds the remaining holder (2) hermetically, exists between the holder (2) and the carrier element (1) through the bearing of the holder (2) against a stop surface (14) of the holding tongue (9, 10).

7 Claims, 1 Drawing Sheet

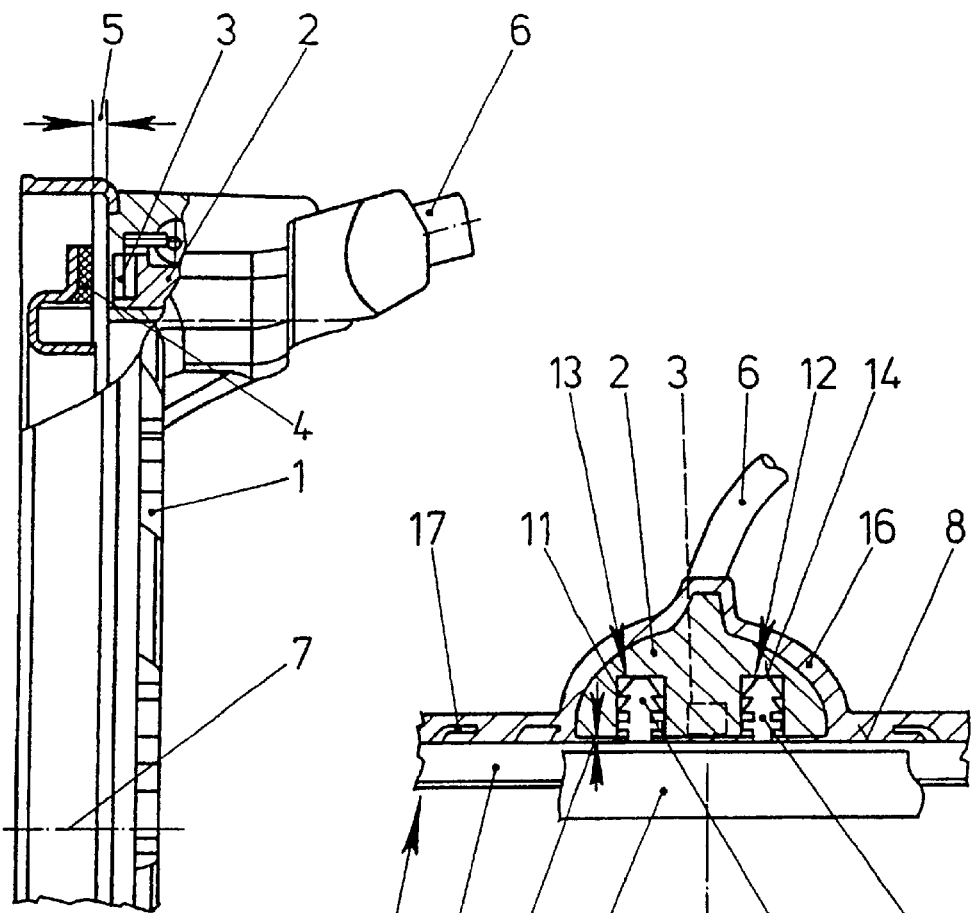
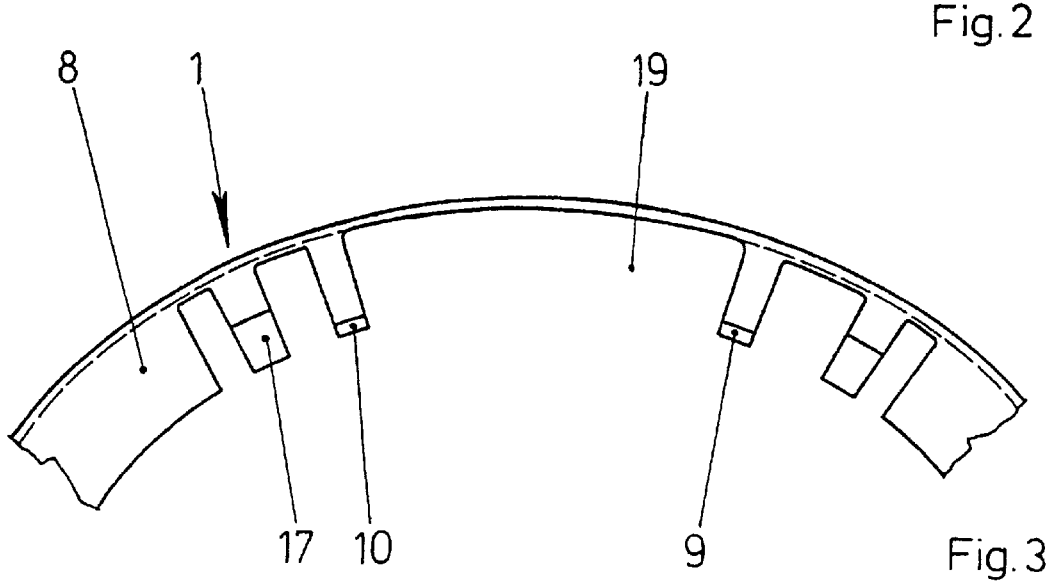

MAGNETIC FIELD SENSOR, AND A METHOD FOR PRODUCING SUCH A SENSOR

FIELD AND BACKGROUND OF THE INVENTION

The invention relates to a magnetic field sensor having a carrier element made from metal, on which a holder with a sensor element is fixed in a set position and joined to the carrier element in a sealing fashion by extrusion coating. Furthermore, the invention relates to a method for producing such a magnetic field sensor.

Magnetic field sensors of the above type are used, for example, in motor vehicles in order to monitor the rotational speed of the vehicle wheels so that braking slip occurring during braking can be detected, and the braking force can be appropriately controlled, or in order to prevent driven wheels from spinning during acceleration. Normally, such magnetic field sensors are equipped with a permanently arranged Hall element in front of which the magnetic encoder rotates at the rotational speed of the wheel. It is important for the functioning that the Hall element has a position that is fixed very precisely relative to the encoder.

Such magnetic field sensors frequently have the problem that they must be arranged at points where dirt and moisture unavoidably occur to an increased extent. In the case of motor vehicles, such magnetic field sensors must be arranged, for example, in the wheel bearing region. The extrusion coating of components has proved itself as protection against dirt and moisture. It has therefore already been considered to fix the holder with the carrier relative to a carrier element in an injection mold, and then to undertake the extrusion coating. However, the problem arises in this case that because of the pressures in the injection mold during injection there is the risk of displacement of the carrier relative to the carrier element such that the precise alignment of the sensor element is lost. Fixing the carrier by means of supports in the injection mold is ruled out, however, because then the pins would form open connections to the holder.

SUMMARY OF THE INVENTION

The invention is based on the problem of fashioning a magnetic field sensor of the type mentioned at the beginning such that the holder holding the sensor element and fixed on a carrier element can be tightly extrusion coated in an injection mold without the attendant risk of the holder being displaced relative to the carrier element. A method for producing such a magnetic field sensor is also to be provided.

According to the invention, the first-named problem is solved in that the holder engages with at least one holding tongue having barbs in a recess in the holder, and in that an interspace, filled up by the extrusion coating, exists between the holder and the carrier element by the bearing of the holder against a stop surface of the holding tongue.

In the case of such a magnetic field sensor, the extrusion coating, produced in the injection mold, of the holder with the sensor element has the result of completely sealing the sensor element, since all sides of the holder can be extrusion coated owing to the interspace between the holder and the carrier element. The magnetic field sensor can therefore also be used without difficulty wherever it is exposed to a large extent to the action of moisture and dirt. The result of fixing the holder by means of at least one holding tongue having barbs is that the holder, and thus also the sensor element, does not change its position on the carrier element during the extrusion molding.

The magnetic field sensor is optimally fashioned for use as a wheel bearing sensor in motor vehicles when, in accordance with an advantageous development of the invention, the carrier element is of annular construction and, for the purpose of fastening by being pushed onto a cylindrical component, has a lateral surface and, adjacent thereto, a radially inwardly directed annular end face on which the holder is fastened.

The fixing of the holder on the carrier element necessarily ensures not only a precise axial spacing, but also ensures precisely fixed angular alignment when, in accordance with a further development of the invention, in its annular end face the carrier element has a cutout that extends in the circumferential direction and at whose opposite ends a holding tongue is arranged in each case, and when the holder bridges this cutout.

A particularly strong retaining force exerted against the holder coming free from the carrier element results when the holding tongues have a fir-tree profile.

An extrusion coating bearing over its entire area on both sides of the holder on the carrier element is reliably joined to the carrier element when the annular end face has notches that point in the axial direction and engage in regions of the extrusion coating that are situated to the side of the holder. These notches form anchoring elements and thereby hold the extrusion coating.

It is easy to ensure the precise spacing between the sensor element and the carrier element, and thus the size of the air gap between an encoder and the sensor element in finally mounted magnetic field sensors when the stop surface is the front end face of the respective holding tongue.

The second-named problem, specifically the provision of a method for producing a magnetic field sensor by the extrusion coating of a carrier which contains a sensor element and is fixed on a carrier element made from metal, is solved according to the invention in that, by means of at least one holding tongue of the carrier element having barbs and engaging in a recess in the holder, the latter is fixed on this carrier element at a short distance therefrom with the formation of an interspace between the holder and the carrier element.

It is possible by this mode of procedure for the holder fixed on the carrier element and having the sensor element to be completely extrusion coated so as to produce an absolutely reliable tightness. Furthermore, as a result of the barbs of the carrier element or the carrier elements the holder cannot be displaced relative to the carrier element by the action of the plastic composition introduced at high pressure into the injection mold.

BRIEF DESCRIPTION OF THE DRAWINGS

The invention permits various embodiments. In order to illustrate its basic principle further, a device according to the invention is illustrated schematically in the drawing and explained below. In the drawing:

FIG. 1 shows a partly sectioned side view of a subregion of a magnetic field sensor according to the invention, FIG. 2 shows a schematic of a horizontal section through the magnetic field sensor, and FIG. 3 shows a front view of a subregion of a carrier element of the magnetic field sensor.

DETAILED DESCRIPTION OF THE PREFERRED EMBODIMENT

FIG. 1 shows in part an annular carrier element 1 made from sheet metal, on which a holder 2 with a sensor element 3 is fastened. An encoder 4 is situated opposite the sensor element 3. There is an air gap 5, the size of which must be maintained very precisely, between the encoder 4 and the sensor element 3. A cable 6 leads away from the holder 2 to an electronic signal processing system (not shown). Whereas the carrier element 1 is to be mounted nonrotatably, the encoder 4 is arranged such that it rotates about an axis 7 coaxially with the carrier element 1 at the rotational speed to be determined by the sensor element 3.

FIG. 2 shows a schematic of a subregion of the carrier element 1 and the encoder 4. Two holding tongues 9, 10, which each have barbs 11 owing to a construction in the shape of a fir tree, project axially from an end face 8 of the carrier element 1, that is to say upwards as seen in FIG. 2. The two holding tongues 9, 10 engage in each case in a recess 12, 13. In this case, their free end strikes with a stop surface 14 against the base of the respective recess 12, 13. The length of the holding tongues 9, 10 is dimensioned such that a small interspace 15 remains between the holder 2 and the end face 8 of the carrier element 1. This interspace 15 and the entire remaining surface of the holder 2 with the sensor element 3 inserted therein are hermetically surrounded by an extrusion coating 16. This extrusion coating 16 covers the entire end face 8 of the carrier element 1, and is additionally fixed on it by means of anchor-like notches 17. In order to mount it in a wheel bearing, the carrier element 1 is fastened on a wheel bearing ring by means of a circumferential lateral surface 18.

FIG. 3 serves the purpose of additionally explaining the fashioning of the carrier element 1. As may be seen, there is provided in its end face 8 a cutout 19 that extends in the circumferential direction and at which one of the holding tongues 9, 10 is located in each case on either side. The notch 17 is likewise to be seen in FIG. 3.

We claim:

1. A magnetic field sensor having a carrier element made of metal, on which a holder with a sensor element is fixed in a set position and joined to the carrier element in a sealing manner by extrusion coating, wherein the carrier element (1) engages with at least one holding tongue (9) in a recess (12, 13) in the holder (2), the tongue 9 having barbs (11), and an interspace (15), filled up by the extrusion coating (16), is formed between the holder (2) and the carrier element (1) by bearing of the holding tongue (9,10) against a stop surface (14) of the recess (12,13).

2. The magnetic field sensor as claimed in claim 1, wherein the carrier element (1) is of annular form and, for fastening by being pushed onto a cylindrical component, has a lateral surface (18) and, adjacent thereto, a radially inwardly directed annular end face (8) on which the holder (2) is fastened.

3. The magnetic field sensor as claimed in claim 2, wherein in the annular end face (8) the carrier element (1) has a cutout (19) that extends in circumferential direction and at opposite ends said holding tongue (9, 10) is arranged in each case, and the holder (2) bridges said cutout 19.

4. The magnetic field sensor as claimed in claim 2, wherein the holding tongues (9, 10) have a fir-tree profile.

5. The magnetic field sensor as claimed in claim 2, wherein the annular end face (8) has notches (17) that point in axial direction and engage in regions of the extrusion coating (16) that are situated to a side of the holder 2.

6. The magnetic field sensor as claimed in claims 1, wherein the stop surface (14) is a front end face of the respective holding tongue (9, 10).

7. The magnetic field sensor as claimed claim 1, wherein the holding tongue is formed on the carrier element.

* * * * *